United States Patent [19]

Staub et al.

[11] 4,379,782
[45] * Apr. 12, 1983

[54] LOW-CALORIE FOODS

[75] Inventors: Herbert W. Staub, Hightstown, N.J.; Larry M. Schanbacher, Yorktown Heights, N.Y.; Jack D. Zencheck, Croton-on-Hudson, N.Y.; Cynthia L. Young, Irvington, N.Y.

[73] Assignee: General Foods Corporation, White Plains, N.Y.

[*] Notice: The portion of the term of this patent subsequent to Dec. 8, 1998, has been disclaimed.

[21] Appl. No.: 309,536

[22] Filed: Oct. 7, 1981

Related U.S. Application Data

[63] Continuation-in-part of Ser. No. 135,597, Mar. 31, 1980, Pat. No. 4,304,768.

[51] Int. Cl.³ .................. A61K 31/70; A61K 31/725
[52] U.S. Cl. ..................................... 424/180; 426/558
[58] Field of Search ............... 424/180, 343, 361, 362; 426/558

[56] References Cited

U.S. PATENT DOCUMENTS

| | | | |
|---|---|---|---|
| 2,952,548 | 9/1960 | Work | 424/180 |
| 3,876,791 | 4/1975 | Rennhard | 424/548 |
| 4,042,914 | 8/1977 | Tones | 426/62 |
| 4,143,163 | 3/1979 | Hutchinson et al. | 426/95 |
| 4,181,747 | 1/1980 | Kickle et al. | 426/615 |
| 4,198,400 | 4/1980 | Biegler | 424/180 |

*Primary Examiner*—Blondel Hazel
*Attorney, Agent, or Firm*—Thomas A. Marcoux; Thomas R. Savoie; Daniel J. Donovan

[57] ABSTRACT

Low-caloric food products are formulated with a high level (in excess of 10% by dry weight) of polysaccharide and/or polyol components and with a level of dietary fiber compositions equal to from ¼ to 2 times the combined level of polysaccharides and polyols contained in the product and effective to reduce polysaccharide and/or polyol-induced diarrhea. Preferred dietary fiber compositions are soy fiber concentrate, citrus albedo, pineapple core bulking agent and sugar beet pulp bulking agent.

7 Claims, No Drawings

LOW-CALORIE FOODS

This is a continuation-in-part of application Ser. No. 135,597 filed Mar. 31, 1980 now U.S. Pat. No. 4,304,768.

TECHNICAL FIELD

This invention relates to the fabrication and manufacture of low-calorie food products which contain a high level of polysaccharides (e.g., polydextrose, polymaltose, modified polydextrose, etc.) and/or polyols (e.g., sorbitol, glycerol, erythritol, xylitol, mannitol, galactitol, etc.). The substitution of non-nutritive, non-fiber bulking agents, such as polysaccharides and polyols, for all or a portion of the caloric, metabolically-active ingredients such as starch or sucrose is well known as a technique of reducing the caloric value of a foodstuff. It has been found, however, that the ingestion of polysaccharides and/or polyols in amounts as low as 30 to 100 grams per day can cause some people to suffer from gastrointestinal discomfort and diarrhea. Accordingly, the use of these materials in low-calorie food products has been limited.

The production of both soluble and insoluble polysaccharide materials is known to the art, as exemplified by U.S. Pat. No. 3,766,165 which teaches polycondensation of saccharides at reduced pressure in the presence of polycarboxylic acids catalysts. This patent also discloses the inclusion of food acceptable polyols in the saccharide-carboxylic acid reaction mixture prior to polycondensation to yield a modified polysaccharide having improved color and taste. U.S. Pat. No. 3,876,794 discloses the use of these polysaccharides in various dietetic foods and U.S. Pat. No. 4,042,714 discloses modified polydextrose-based, farinacious food compositions. All of these patents which are assigned to Pfizer Inc., New York, N.Y. are hereby incorporated by reference.

DISCLOSURE OF INVENTION

The present invention relates to the control of diarrhea induced by ingesting low-calorie foodstuffs which contain polysaccharides and/or polyol materials. According to this invention, dietary fiber preparations are incorporated into polysaccharide and/or polyol-containing foodstuffs at a level sufficient to exhibit an antidiarrheal effect.

As will be recognized by those skilled in the art, small amounts, typically up to about 5% dry weight basis of the total dietary intake, of polysaccharides and polyols can be ingested without causing any adverse gastrointestinal effects. Various individuals will be able to ingest varying amounts of polysaccharides and/or polyols without adverse effect; however, as the diets of the individuals consuming a polysaccharide and/or polyol-containing foodstuff is not controlled by the food manufacturer, it is advisable to take preventive measures in connection with all foodstuff which contain significant amounts of polysaccharides and/or polyols. This will particularly be true when the foodstuff is marketed as a low-calorie product and is but one of a series of low-calorie, polysaccharide and/or polyol-containing products which a weight conscious consumer might ingest during the day.

The polysaccharides that are contemplated for use in this invention include polyglucose and polymaltose in either their soluble or insoluble form. The materials may be homopolymers of glucose and maltose or be modified polymers of these materials, such as described in the aforementioned Pfizer patents. For instance, the glucose or maltose moieties may be esterified or contain a chemically bonded, food-acceptable polyol such as sorbitol.

The polyols that are contemplated for use in this invention may be any of the polyhydric alcohols suitable for use in foods, including glycerol, sorbitol, propylene glycol, mannitol, xylitol, erythoritol and galactitol.

The dietary fiber preparations evaluated for use in this invention include edible fiber materials derived from grains, fruits and vegetables which contain an amount of cellulose fiber. Materials wherein the dietary fiber consists essentially of hemi-cellulose or consists essentially of pectin substances and which do not contain any cellulosic fiber have not been found suitable for purposes of this invention. Among the dietary fiber preparations which have been found to reduce severity of polysaccharide and/or polyol-induced diarrhea are corn hull fiber, wheat bran, and alpha-cellulose; however, preferred for use in this invention are the fiber materials known as soy fiber concentrate (SFC), citrus albedo, especially orange albedo, pineapple core bulking agent and sugar beet pulp bulking agent. These materials are preferred because their anti-diarrheal activity has been demonstrated to be higher than the other dietary fiber materials which have been tested. Specifically, rat studies have shown that at certain identical levels, several dietary fibers are capable of reducing polysaccharide and/or polyol-induced diarrhea; whereas, SFC, citrus albedo, pineapple core bulking agent and sugar beet pulp bulking agent were able to completely control (i.e., eliminate) polysaccharide and/or polyol-induced diarrhea.

Soy fiber concentrate is the material obtained by deoiling dehulled soybeans followed by water extracting the deoiled material. Soy fiber concentrate is essentially the cell wall material remaining after soybeans have been dehulled and the oil, protein and soluble carbohydrates have been extracted.

Citrus albedo is the whitish inner portion of the rind of citrus fruit that is commonly regarded as a source of pectin, and typically contains on the order of 40% pectin and 27% cellulose by weight. The crude albedo is preferably extracted with water to remove soluble carbohydrates and may also be extracted with isopropyl alcohol to remove any off-colors and off-flavors. Such treatment will yield a material which can be dried and ground to produce a bland-tasting, fiber-containing albedo flour which is useful as a low-caloric bulk filler.

Pineapple core is a waste by product of the pineapple canning industry. The pineapple core is coarsely ground or shreaded, extracted with water to remove soluble carbohydrates and may also be extracted with isopropyl alcohol to remove any off-flavors and off-colors. After drying and grinding, the pineapple core bulking agent thus produced is a bland, decolorized, fiber-containing material which is low in calories and which is useful as a bulk filler. The pineapple core bulking agent contains approximately 5 to 10% total pectin, approximately 35% cellulose and approximately 30% hemicellulose on a dry weight basis.

Sugar beet pulp is a waste by product of the sugar industry. The sugar beet pulp, usually in the form of sugar beet cossettes can be collected from a sugar beet processing plant and placed in a solution of sodium metabisulphite to prevent darkening of the pulp due to polyphenol oxidase activity. The Sugar beet pulp can be drained and further processed or frozen stored. The sugar beet pulp material is coarsely ground or sliced, water washed to remove soluble carbohydrates and may also be extracted with isopropyl alcohol to remove any off-colors and off-flavors. When the material is dried and ground a whitish, bland-tasing, fiber-containing bulk filler is produced which contains approximately 25 to 30% cellulose, 15% hemicellulose and 15 to 20% pectin on a dry weight basis.

Materials such as polysaccharide and polyol are believed to induce diarrhea because they are not metabolized or otherwise broken down in the stomach or small intestine and move rapidly into the colon. It is further speculated that because of an osmotic and metabolic effect of the fermentation products of polysaccharides, and polyols large amounts of water are pulled into the colon where bacterial fermentation rapidly occurs. A high water and gas level will facilitate adverse activity within the colon and produce a diarrheal condition.

Fiber material has been generally thought of as a means to decrease transit times and increase fecal output, or, in other words, to promote a favorable laxation, stool softening and bulking effect. It was, therefore, surprising to discover that selected naturally-occurring fiber materials are able to control and/or alleviate polysaccharide and/or polyol-induced diarrhea.

The present invention will be applicable to low-calorie food products which contain in excess of 10% by weight (dry basis) of polysaccharides and/or polyols. For purpose of this invention, the term "low-calorie food" is used to represent foods having a caloric content of 50% or less of the caloric value of corresponding ordinary food. Thus, a low-calorie cake is one that has only half or less than half of the calories of the same type of cake prepared with standard ingredients. Typically, the low-calorie food products of this invention will have a calorie content of less than about 2 calories per gram. The products of this invention will preferably contain a level of polysaccharides and/or polyols of at least 20% by weight (dry basis) and may reach levels as high as 60% or more by weight (dry basis). The amount of dietary fiber composition which is present in the products of this invention will range from ¼ to 2 times the combined level of polysaccharides and polyols contained in the product, and preferably will be at from ½ to about 1.5 times this level, and typically will be about 1.0 times this level.

When soluble polysaccharides are employed, they will, as recognized by those skilled in the art, typically be utilized in combination with artificial or other intensive sweeteners as replacements for natural sugars. Polyols which are soluble and possess varying levels of sweetness may also be utilized as sugar replacements, either alone or in combination with intensive sweeteners. Insoluble polysaccharides will typically be used as a replacement for flour.

As will be recognized by those skilled in the art, the presence of the fiber component within the formulations contemplated by this invention might render such formulations undesirable for certain products in which the consumer would not readily accept a fiber component. The formulations of this invention are, however, suitable for use in a wide range of low-calorie foodstuffs, including baked goods, (e.g., breads, cakes, etc.) puddings, confections, pastas, noodles, jams, toppings, sauces and dressings. The determination of the levels of various standard food ingredients to be used in formulating the low-calorie products of this invention can be readily made by those skilled in the art. Stanard manufacturing procedures can be applied to the production of these products.

Animal studies employing young adult male Sprague Dawley rats have demonstrated the effectiveness of adding dietary fiber to diets which contain high levels of modified polydextrose and/or polyols. In this experiment, the animals were fed with a standardized diet containing on a weight basis 18% casein, 10% water, 8% corn oil, 4% salt, 1% vitamin mix and 59% cornstarch and were allowed 150 grams of diet each week. The animals exhibited no diarrhea on this diet. Test diets were formulated by substituting modified polydextrose (MPD), polyol and/or fiber material for an equal weight of the cornstarch. The animals' feces was observed each day and rated according to the following laxation fecal scoring scale:

- −1—no feces
- 0—no diarrhea
- 1—mild diarrhea, soft formed stool but stringy or irregular
- 2—moderate diarrhea, very soft stools, mounded
- 3—severe diarrhea, liquid stools Test diets were fed for 14 days and each animal was given a diarrheic score which was the sum of its 14 daily scores. The median diarrheic score of the animal group was used in evaluating the respective test diets and the results set forth in Table I were obtained.

TABLE I

| Weight % of this diet | medium diarrheic score |
| --- | --- |
| 10% Xylitol | 9 |
| 10% Xylitol, 5% Wheat Bran | 4.5 |
| 10% Xylitol, 10% Wheat Bran | 4.5 |
| 30% Xylitol | 25 |
| 30% Xylitol, 5% Wheat Bran | 19 |
| 30% Xylitol, 10% Wheat Bran | 16.5 |
| 10% Modified Polydextrose (MPD) | 36 |
| 10% MPD, 5% Wheat Bran | 19 |
| 10% MPD, 10% Wheat Bran | 7 |
| 20% MPD | 38 |
| 20% MPD, 5% Wheat Bran | 35 |
| 20% MPD, 10% Wheat Bran | 26 |

As can be seen from the above results, both xylitol and MPD are capable, at sufficient levels in the diet, of producing a diarrhea condition and that the addition of wheat bran to the diet is able to reduce the severity of the diarrhea condition.

An additional study to assess the laxation effects of various levels of dietary fiber was made using male Sprague Dawley rates (201 to 225 gms.) which were fed ad libitum for 14 days. During this time, the fecal output for each of the various rat diets were scored according to the following laxation fecal scoring scale:

| | |
| --- | --- |
| Acceptable Laxation | 0 - small, hard, well-formed pellets |
| | 1 - larger, hard, well-formed pellets |
| | 2 - large, soft, elongated pellets with tapered ends |
| Unacceptable Diarrheal | 3 - very soft pile of feces |
| | 4 - no form, very loose stools |
| | 5 - watery propulsive diarrhea |

The average 14 daily fecal scores for the test population are set forth in Table II which shows the laxation effects of various dietary fibers fed at various levels in the aforementioned standard casein diet.

TABLE II

| Diet | % Fiber by Wt. in Diet | Average Daily Fecal Score |
|---|---|---|
| Control (18% casein) | 0 | 0.21 |
| Orange Albedo Flour (sample #1) | 5 | 0.32 |
| | 10 | 0.47 |
| | 20 | 0.80 |
| Orange Albedo Flour (sample #2) | 10 | 0.42 |
| | 20 | 0.76 |
| Alpha Cellulose | 10 | 1.10 |
| | 20 | 1.60 |
| Soy Fiber Concentrate | 5 | 0.25 |
| | 10 | 0.36 |
| | 20 | 0.77 |
| Corn Hull Flour | 5 | 0.70 |
| | 10 | 1.01 |
| | 20 | 1.10 |
| Wheat Bran | 10 | 1.00 |
| | 20 | 1.00 |
| Hemi-Cellulose (extracted from Corn) | 10 | 1.35 |
| MPD | 10 | 2.96 |
| | 20 | 4.00 |

The effect of these same dietary fibers in controlling diarrhea induced by the standard casein diet containing 20% by weight of MPD is set forth in Table III. The treatment period was again 14 days and the fecal score value was arrived at in the manner of Table II.

TABLE III

| Diet (with 20% MPD) | % Fiber by Wt. in Diet | Average Daily Fecal Score |
|---|---|---|
| MPD Control | 0 | 4.0 |
| Orange Albedo Flour (sample #1) | 10 | 1.7 |
| | 20 | 1.55 |
| Orange Albedo Flour (sample #2) | 10 | 2.0 |
| | 20 | 1.75 |
| Alpha Cellulose | 10 | 2.66 |
| | 20 | 2.22 |
| Soy Fiber Concentrate | 10 | 2.47 |
| | 20 | 1.75 |
| Corn Hull Flour | 10 | 3.85 |
| | 20 | 2.95 |
| Wheat Bran | 10 | 3.02 |
| | 20 | 2.51 |
| Hemi-Cellulose | 10 | 4.05 |
| | 20 | 4.15 |

As can be seen from the data in Table III, all of the tested dietary fibers with the exception of hemi-cellulose were able to effect a reduction in MPD-induced diarrhea. Additionally, both orange albedo flour samples and soy fiber concentrate are able to completely control (i.e., reduced fecal score to 2.0 or less) MPD-induced diarrhea.

Using the same scoring system employed to obtain the results of Tables II and III, tests were conducted to show the effect of several of the same dietary fibers in controlling diarrhea acutely induced by orally dosing animals with 1.0 ml of an aqueous solution containing 28% by weight xylitol. The results of this study is set forth in Table IV.

TABLE IV

| Diet (challenged with 280 mg of xylitol) | % Fiber by Wt. in Diet | Average Daily Fecal Score |
|---|---|---|
| Control (18% casein) | 0 | 4.0 |
| Orange Albedo Flour (sample #1) | 10 | 2.5 |
| | 20 | 2.05 |
| Orange Albedo Flour (sample #2) | 10 | 3.0 |
| | 20 | 1.6 |
| Soy Fiber Concentrate | 10 | 1.15 |
| | 20 | 1.75 |
| Corn Hull Fiber | 10 | 3.0 |
| | 20 | 2.1 |
| Wheat Bran | 10 | 1.0 |
| | 20 | 1.0 |

As can be seen from the data in Table IV, all of the tested fibers were able to effect a reduction in xylitol-induced diarrhea and several fibers were able to completely control xylitol-induced diarrhea.

The following tests (See Tables V and VI) which utilize the same procedure and laxation fecal scoring scale employed to obtain the results in Tables II and III have demonstrated the effectiveness of pineapple core bulking agent and sugar beet pulp bulking agent in the control of diarrhea induced by modified polydextrose. It is believed that these two additional fiber sources will prove effective in controlling polyol-induced diarrhea as well.

The laxation effects of various dietary fibers are set forth in Table V. The results obtained from this experiment which was conducted utilizing the same scientific method as was previously discussed to obtain the results listed in Table 11, clearly shows that when the fiber sources are fed alone at the levels indicated they all significantly increased the fecal scores, or produce an acceptable and favorable laxation/bulking effect. The average fecal score results produced by feeding orange albedo flour, pineapple core or sugar beet pulp sources in the diet are clearly less than that of alpha cellulose (fecal score of 1.15), and yet greater than that of the control diet (fecal score of 0) in this study.

TABLE V

| Diet | % Fiber by Wt. in Diet | Average Daily Fecal Score |
|---|---|---|
| Control (18% casein) | 0 | 0 |
| Alpha Cellulose | 20 | 1.15 |
| Orange Albedo Flour (sample #3) | 20 | 0.79 |
| Sugar Beet Pulp Bulking Agent | 10 | 0.19 |
| | 20 | 0.43 |
| Pineapple Core Bulking Agent | 10 | 0.21 |
| | 20 | 0.54 |

The effect of orange albedo flour, pineapple core bulking agent and sugar beet pulp bulking agent in controlling diarrhea induced by the standard casein diet containing 20% by weight of MPD is set forth in Table VI. The treatment period was again 14 days and the fecal score value was arrived at by the same manner explained in Table III.

Results in Table VI clearly show that with 20% MPD in the diet, all three fiber sources fed significantly reduce the severity of the average fecal scores. Addition of either 10 or 20% levels of orange albedo flour, sugar beet pulp or pineapple core samples are able to completely control (i.e., reduce or maintain average fecal scores to 2.0 or less) MPD-induced diarrhea.

TABLE VI

| Diet (with 20% MPD) | % Fiber by Weight in Diet | Average daily fecal scores |
|---|---|---|
| MPD control | 0 | 3.95 ± 0.01 |
| Orange Albedo Flour (sample #3) | 10 | 1.57 ± 0.04 |
| | 20 | 1.48 ± 0.10 |
| Sugar Beet Pulp (6909-56) | 10 | 1.70 ± 0.09 |
| | 20 | 1.65 ± 0.13 |
| Pineapple Core | 10 | 1.07 ± 0.08 |

TABLE VI-continued

| Diet (with 20% MPD) (6909-57) | % Fiber by Weight in Diet | Average daily fecal scores |
|---|---|---|
| (6909-57) | 20 | 0.87 ± 0.05 |

As will be recognized by those skilled in the art, the present invention will permit the formulation of low-caloric foodstuffs which contain higher levels of polysaccharides and/or polyols than could previously be contemplated. Thus, an additional degree of flexibility is given to manufacturers of low-caloric foodstuffs.

What is claimed is:

1. A low-calorie foodstuff containing edible polysaccharides, polyols or combinations thereof in excess of 10% by weight of the foodstuff, dry basis, and an amount of a cellulose-containing dietary fiber composition effective to reduce diarrhea induced by said polysaccharide, polyol, or combinations thereof, said amount being from ¼ to 2 times the combined level of polysaccharides and polyols and said fiber composition being derived from the group consisting of pineapple core, sugar beet pulp and combinations thereof.

2. The product of claim 1 wherein the level of polysaccharides, polyols or combinations thereof is in excess of 20%.

3. The product of claim 2 wherein the polysaccharide is selected from the group consisting of polyglucose, modified polyglucose, polymaltose and modified polymaltose and combinations thereof.

4. The product of claim 2 wherein the polyol is selected from the group consisting of sorbitol, glycerol, xylitol, mannitol and combinations thereof.

5. The product of claim 1 or 2 wherein the dietary fiber composition is pineapple core bulking agent.

6. The product of claim 1 or 2 wherein the dietary fiber composition is sugar beet pulp bulking agent.

7. The product of claim 2 wherein the dietary fiber level is from ½ to 1.5 times the combined level of polysaccharides and polyols.

* * * * *